United States Patent [19]

Cristell

[11] Patent Number: 4,534,147
[45] Date of Patent: Aug. 13, 1985

[54] DUCT MOLDING AND CABLE MOUNTING CLIPS

[75] Inventor: Frank A. Cristell, Lakewood, N.J.
[73] Assignee: Robert H. Donahue, Westfield, N.J.
[21] Appl. No.: 448,246
[22] Filed: Dec. 9, 1982
[51] Int. Cl.³ .................... H02G 3/04; E04F 19/04
[52] U.S. Cl. ...................... 52/287; 52/220; 52/288; 174/48; 174/49
[58] Field of Search ............ 52/287, 717, 220, 221, 52/288; 174/48, 49

[56] References Cited

U.S. PATENT DOCUMENTS

| | | | |
|---|---|---|---|
| 3,302,350 | 2/1967 | Brown et al. | 52/287 |
| 3,408,250 | 10/1968 | Finefrock | 52/288 X |
| 3,721,762 | 3/1973 | Gooding | 174/42 |
| 3,786,171 | 1/1974 | Shira | 174/48 |
| 4,244,544 | 1/1981 | Kornat | 248/68 |
| 4,423,284 | 12/1983 | Kaplan | 52/221 X |

FOREIGN PATENT DOCUMENTS

| | | | |
|---|---|---|---|
| 2621772 | 4/1976 | Fed. Rep. of Germany | 52/287 |
| 2825147 | 12/1979 | Fed. Rep. of Germany | 52/288 |
| 2425518 | 1/1980 | France | 52/287 |
| 449739 | 12/1966 | Switzerland | 174/48 |
| 465687 | 12/1966 | Switzerland | 174/48 |

Primary Examiner—J. Karl Bell
Assistant Examiner—Creighton H. Smith
Attorney, Agent, or Firm—Robert D. Farkas

[57] ABSTRACT

A duct molding for cables is provided for securely and efficiently mounting cables on the outside portion of a wall and/or ceiling. The subject duct molding includes an elongated tubular duct molding portion having a base and cover which can be at least partially disassociated from one another to provide access to the cables. Cables retaining clips are mounted on the base on the inside portion of the tubular duct molding. Each cable retaining clip includes a plurality of recesses formed by spring fingers which can removably retain individual cables. Expansion modules can be mounted in recesses of the cable retaining clip to expand the cable retaining capacity of the subject duct molding. Duct molding corner members are provided to enable mounting of the subject duct molding against sections of wall or ceiling that are angularly related to one another.

15 Claims, 6 Drawing Figures

DUCT MOLDING AND CABLE MOUNTING CLIPS

BACKGROUND OF THE INVENTION

The demand for cable television has continually increased, particularly in the suburban areas of the country. The growth of cable television in the urban centers of the country, however, typically has been less pronounced than in the surrounding suburbs. One reason for the lower rates of subscriptions to cable television services in urban areas has been the logistical problems associated with delivering the cable services to individual units in a densely populated region. More particularly, the urban areas typically include large apartment houses, each unit of which may require its own direct cable connection.

To provide cable television services to multi-family/multi-story dwelling units, such as apartment houses, trunk lines are directed through the walls of the building, and access points or "tap-in" locations are provided on each floor of the building. Individual cables then are run from these access points to the specific apartments subscribing to the cable television service.

It is desirable to protect the cables going to the individual apartments, while also ensuring that cables are reasonably accessible for maintenance, replacement or removal. It is also desirable to install the cables in a systematic way that enables the running of additional cables on a particular floor of an apartment house as the number of cable television subscribers on that floor increases.

To accomplish these objectives, it is known to mount ducts on the outer surfaces of walls on each floor of the apartment building. The ducts extend from the trunk line access location, and around halls or other common areas on the floor. Each subscriber's cable extends through the duct to a location where the duct is adjacent the apartment of the subscriber. The cable then extends into the apartment of the subscriber for an appropriate electrical connection to the television of the subscriber.

To enhance the aesthetic appearance of the ducts in the common areas of the apartment building, and to improve the accessibility to the cables stored therein, duct moldings has been developed. Typically, the duct molding is mounted where the ceiling and wall meet. Prior art duct molding has been formed from a plastic material, such as PVC, and has included a base member and a separate cover member that is attachable to the base. In use, the base of the prior art duct molding is mounted in its proper position against the wall and ceiling. The cables then are held manually in place as sections of the cover member are sequentially mounted on the base. Each section of the cover member cooperates with the base to retain the cables in the duct.

To add cables to the prior art duct molding, it has been found impractical to remove all sections of the cover between the trunk line and the specific apartment to which service is being provided. More particularly, if all the cover sections were removed, the cables already in the prior art duct molding would sag by their own weight making replacement of the cover difficult. Consequently, it is often the practice to remove only alternate sections of the cover of the prior art duct molding, and to urge the cable through the sections of the prior art duct molding that remain in tact. This enables the latter sections of the cover to support the cable Similarly, to disconnect a subscriber from the cable television service, the problems associated with disassembling the prior art duct molding have discouraged workers from entirely removing the subscriber's cable. As a result, the installers typically merely disconnect the individual cable at the access location to the trunk line, but will leave the disconnected cable in the prior art duct molding. This practice has made it quite easy for the disconnected cable subscriber to "tap" his cable back into either another individual cable or the trunk line extending into his floor of the apartment building.

It has also been difficult to trace individual cables through the prior art duct molding as part of trouble shooting efforts. More specifically, the cables tend to be randomly grouped into the prior art duct molding making it difficult to distinguish a specific cable at any location outside the apartment to which that cable is directed. This problem often is dealt with by using color code systems which generally are known only to the individual making the initial installation. Thus subsequent installers are usually confused by the system when other installations or repairs are required.

Accordingly, it is an object of the subject invention to provide a duct molding into which cables can be readily mounted.

It is another object of the subject invention to provide a duct molding into which additional cables can be easily installed.

It is a further object of the subject invention to provide a duct molding that enables efficient maintenance or removal of cables previously placed therein.

It is an additional object of the subject invention to provide a duct molding having a cable carrying capacity that can be readily expanded.

It is still another object of the subject invention to provide a duct molding having a hingedly attached cover member.

It is still a further object of the subject invention to provide a duct molding that can be readily opened and securely closed.

It is still an additional object of the subject invention to provide a duct molding into which removable cable carrying clips may be securely mounted.

It is yet another object of the subject invention to provide a duct molding with removably mountable cable retaining clips, the cable carrying capacity of which can be readily expanded.

It is yet a further object of the subject invention to provide a duct molding that is easy to install and that is aesthetically attractive once in position.

SUMMARY OF THE INVENTION

The duct molding of the subject invention comprises an elongated tubular member which is used in conjunction with a plurality of cable retaining clips removably mounted at spaced intervals therein. The tubular member of the subject duct molding includes a base and a cover. The base and cover preferably are extruded from a plastic material with desirable structural and fire resistant characteristics. More particularly, it is preferred that the base and cover members be extruded to define a unitary structural plastic member with a living hinge defining the connection therebetween. Alternatively, the base and cover may be extruded to define separate members which are attachable to one another. Generally the subject duct molding will be manufactured in several standard lengths, and then cut to their desired size by the installer.

Typically, the duct molding of the subject invention is mounted in a right angle corner formed by a wall and ceiling of a building. Therefore, the base of the subject duct molding includes two mounting panels which are disposed at right angles to one another for face-to-face mounting against the wall and ceiling. Preferably, these mounting panels of the base do not intersect one other directly, but are joined by a connecting panel. As explained further below, this structure enables easy mounting of the subject duct molding despite imperfections or irregularities in the juncture between the wall and ceiling of the building.

The mounting panels of the base of the duct molding preferably include strips of strong two-sided adhesive to enable at least an initial mounting of the subject duct. If desirable, separate mounting members such as screws can be employed to more securely mount the subject duct molding against the wall and ceiling.

The cover of the subject duct molding preferably is formed integrally with the base, and is articulated thereto by a living hinge which is disposed adjacent one edge of the base. In use, the living hinge preferably is disposed adjacent the mounting panel which is positioned against the wall of the building. The edge of the base opposite the living hinge is adapted to releasably engage the opposite edge of the cover member. Thus, the cover member may be rotated between opened and closed positions. As an alternate embodiment, the base and cover members of the subject duct molding may be extruded to form separate members, which may be easily attached to one another after the base is affixed to the wall and ceiling of the building.

A plurality of cable retaining clips are provided for mounting in the subject duct molding and for neatly retaining an array of cables therein. Each cable retaining clip preferably is injection molded from plastic material. The cable retaining clips and the base of the duct molding are formed to enable the removable but secure mounting of the cable retaining clips at any location along the base of the duct molding. Thus, the cable retaining clips may be properly positioned in the base regardless of the length to which the base is cut by the installer.

Each cable retaining clip follows the general cross sectional outline of the base of the duct molding and includes a plurality of accurate cable retaining recesses. Each cable retaining recess in the cable retaining clips is defined by a pair of resilient spring fingers which bend sufficiently to enable mounting of the respective cables, but also biasingly return to their initial positions to prevent accidental removal of the cables. In use, the cable retaining clips are mounted in the subject duct molding at desired spaced intervals. The individual cables then are snapped into the respective recesses to provide a secure and efficient retention of the cables. More particularly, cable retaining clips, as described herein, enable the cables to be mounted in a manner that prevents their sagging when the duct molding cover is opened, and also enable the easy tracing of individual cables for maintenance or removal purposes.

Expansion modules also are provided which can be securely mounted in a cable retaining recess of each cable retaining clip. These expansion modules easily and efficiently enable the expansion of the cable carrying capacity of the subject duct molding.

The subject duct molding further can be used in conjunction with inside or outside corner members which enable the subject molding to be employed along non-continuous sections of wall or ceiling. These corner sections each are designed to accept the cable retaining clips described herein.

DETAILED DESCRIPTION OF THE PREFERRED EMBODIMENTS

Figure 1:
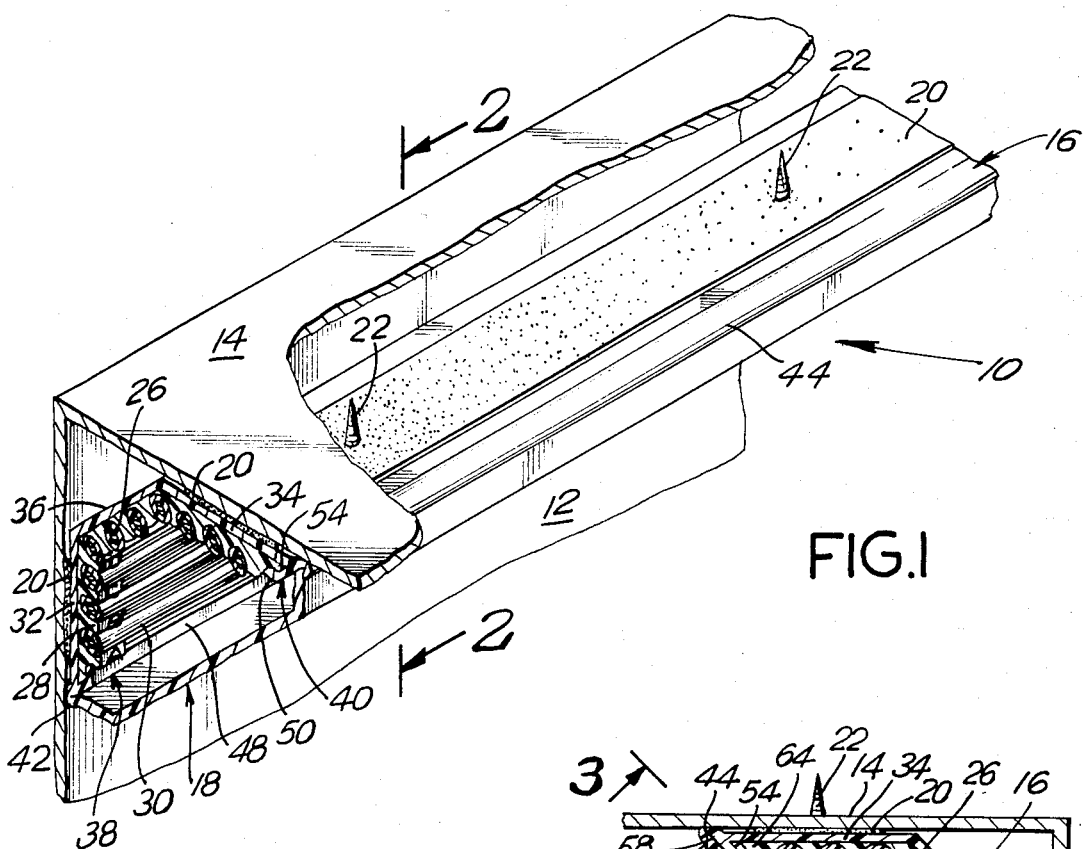
FIG. 1 is a perspective view, partially in section, of the duct molding and cable retaining clips of the subject invention.

As shown in FIG. 1, the duct molding of the subject invention is generally designated by the numeral 10 and comprises an elongated tubular structure constructed for mounting against both a wall 12 and ceiling 14. The duct molding 10 includes a base 16 and a cover 18 which preferably have been constructed from a plastic material which has been extruded into the desired configuration. The base 16 of the duct molding 10 preferably is held in position against the wall 12 and ceiling 14 by a two sided adhesive tape 20. Additional structural support for the duct molding 10 may be provided by screws which extend through the base 16 into the wall 12 and/or ceiling 14.

The base 16 of the duct molding 10 is adapted to removably retain a plurality of cable retaining clips 24. Each cable retaining clip 24 includes a plurality of spring fingers 28 which define concavely arcuate recesses 26 for securely retaining cables 30 as explained further below.

Figure 2:
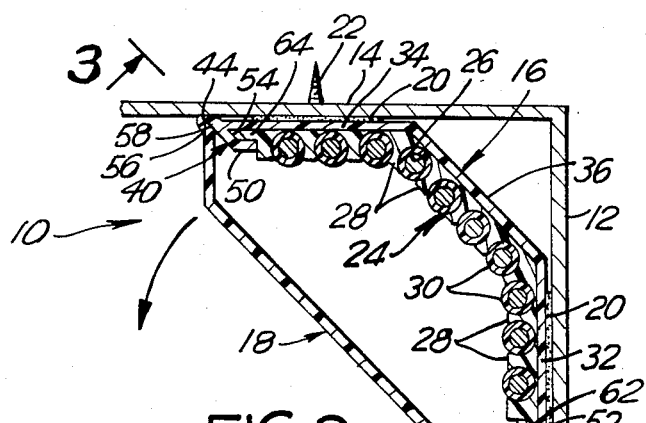
FIG. 2 is a cross sectional view taken along line 2—2 in FIG. 1.
Figure 3:
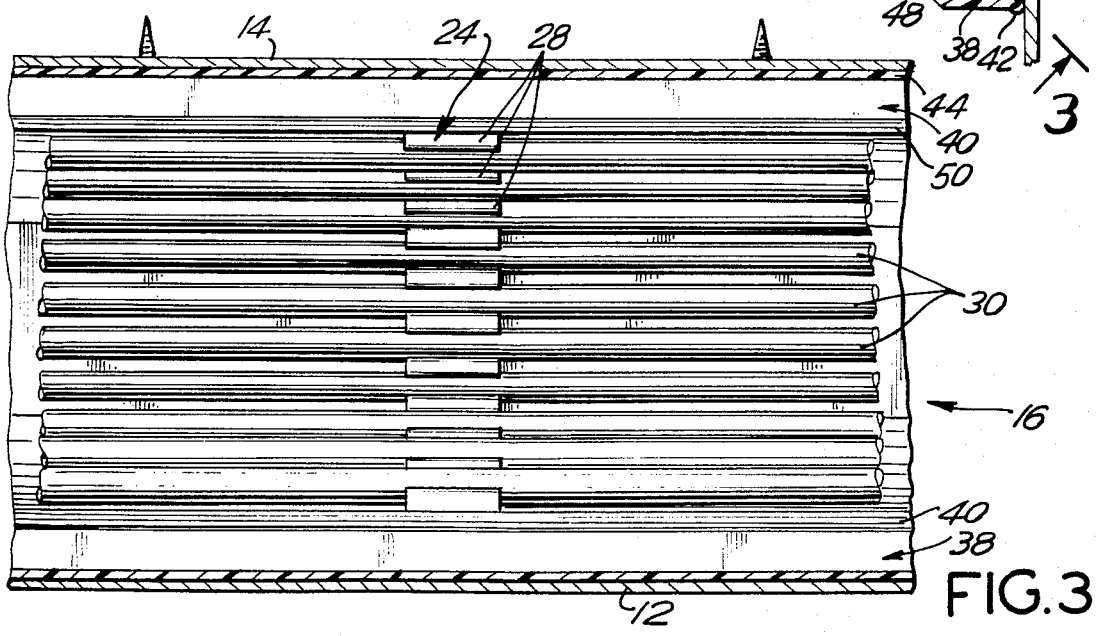
FIG. 3 is a cross sectional view taken along line 3—3 in FIG. 2.

Referring to FIGS. 1 through 3, the base 16 of the duct molding 10 includes a wall mounting panel 32 and a ceiling mounting panel 34. The wall and ceiling mounting panels 32 and 34 are disposed in planes generally perpendicular to one another, and are joined by a corner panel 36 which is aligned at an approximately 45° angle with respect to the wall 32 and ceiling 34 mounting panels. The angular alignment of the corner panel 36 with respect to the wall and ceiling mounting panels ensures that the latter can be properly seated against the wall 12 and ceiling 14 despite cracks or other irregularities at the juncture between the wall and ceiling.

The base 16 of the duct molding 10 further includes rails 38 and 40 which are mounted adjacent the wall and ceiling mounting panels 32 and 34 respectively. More particularly, rail 38 is mounted adjacent the edge 42 of the wall mounting panel 32 most distant from the corner panel 36. Similarly, the rail 40 is located adjacent the edge 44 of ceiling mounting panel 34 most distant from the corner panel 36. Rails 38 and 40 include flanges 48 and 50 respectively, which are spaced from and substantially parallel to the respective wall 32 and ceiling 34 mounting panels. In this manner, mounting slot 52 is provided adjacent edge 42 of the wall mounting panel 32. Similarly, mounting slot 54 is provided adjacent edge 44 of ceiling mounting panel 34. Slots 52 and 54 extend the entire length of base 16, thereby enabling clips 24 to be mounted at any desired location along base 16.

The cover 18 of the duct molding 10 is hingedly connected to the base 16 along edge 42 of the wall mounting panel 32. As illustrated in FIGS. 1 through 4, the cover 18 and base 16 are preferably extruded as a unitary member. The cover 18 is further defined by edge 56 which is generally parallel to the hinged connection 42 between the base 16 and cover 18. Additionally, the cover 18 is dimensioned such that the edge 56 is lockingly receivable in the groove 58 formed in the base 16 adjacent edge 44 of the ceiling mounting panel 34. Preferably the cover 18 extends convexly away from the base 16 to facilitate the locking engagement or disengagement of edge 56 in groove 58. Thus, the cover 18, can be flexed slightly to enable edge 56 to be placed in or removed from groove 58.

The cable retaining clip 24 is configured to follow the cross sectional outline defined by the wall 32 and ceiling 34 mounting panels and the corner panel 36 of the base 16, as shown most clearly in FIG. 2. Additionally, the cable retaining clip 24 includes mounting bosses 62 and 64 which are dimensioned to be slidably accepted into the slots 52 and 54. This cooperation between the bosses 62 and 64 and slots 52 and 54 enables each cable retaining clip 24 to be securely but removably mounted at any point along the base 16.

Each cable retaining clip 24 includes a plurality of concavely arcuate recesses 26 each of which defined by a pair of spring fingers 28. The latter are sufficiently resilient to enable the cables 30 to be securely but removably mounted in the cable retaining clip 24. More particularly, each spring finger includes a base portion and an enlarged head portion, with the head portions in each pair of spring fingers 28 retaining the cable.

The cable retaining clips 24 preferably are spaced several feet apart along the elongated base 16 of the duct molding 10. The cables 30 then are snapped into position in appropriate recesses 26. Preferably, the cables are mounted in the cable retaining clips 24 so as to define an array of parallel cables, thereby facilitating the tracing of individual cables for maintenance or removal. To further facilitate the tracing of cables, the spring fingers 28 are consecutively lettered or numbered, as shown most clearly in FIG. 1. Thus, at any point along the duct molding 10, the location of a cable for a specific user can be readily located.

Figure 4:
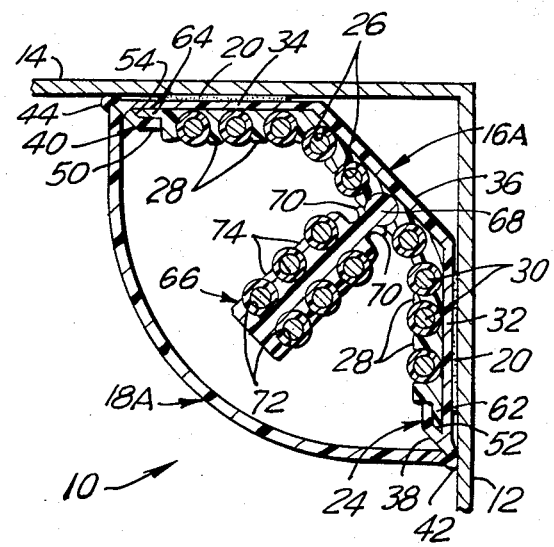
FIG. 4 is a cross sectional view of a second embodiment of the subject invention.

Referring to FIG. 4, a second embodiment of the duct molding 10 is provided with an expansion module 66. The expansion module 66 includes a cylindrical mounting hub 68 which is dimensioned to be received in a recess 26 of the cable retaining clip 24. Support legs 70 are provided adjacent the hub 68 to minimize the rotational movement of the expansion module 66 once it is in position. The expansion module 66 further includes a plurality of recesses 72 defined by spring fingers 74. As with the cable retaining clip 24, the spring fingers 74 of the expansion module 66 are resilient, thereby enabling the cables 30 to be securely but removably retained in the expansion module 66. Thus, the expansion module 66 enables the cable carrying capacity of the duct molding 10 to be substantially increased. The potential for increasing the cable carrying capacity of the duct molding 10 illustrated in FIG. 4 is further enhanced by providing an arcuate cover 18A which defines a significantly larger enclosure for the duct molding than the cover 18 illustrated in FIG. 2. It is noted, that the duct molding 10 can be provided with covers of various shapes to define either larger or smaller enclosures, and to conform to a variety of architectural or aesthetic requirements.

Figure 5:
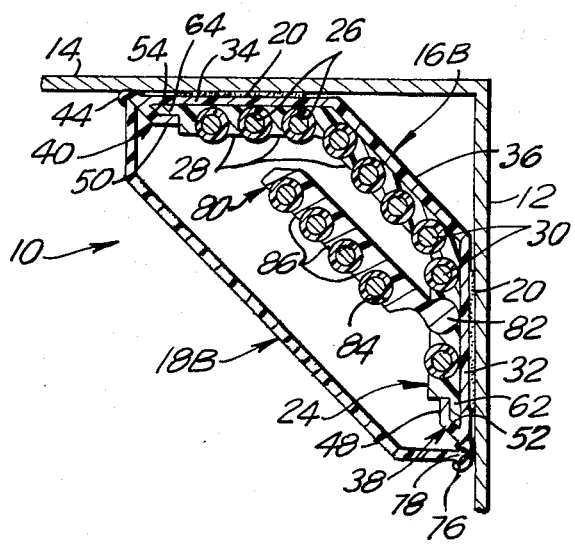
FIG. 5 is a cross sectional view of a third embodiment of the subject invention.

FIG. 5 shows a third embodiment of the duct molding 10. More particularly, the base 16B and the cover 18B are not of unitary construction. Rather, the base 16B is provided with a generally cylindrical groove 76 and the cover 18B is provided with at least one generally cylindrical journal 78 which can be snapped into and rotate within the groove 76. Thus, the journal 78 and groove 76 cooperate to provide a hinged connection between the cover 18B and the base of 16B.

FIG. 5 also illustrates an alternate expansion module 80. The expansion module 80 includes a hub 82 which is rotatably receivable in the recesses 26 of the cable retaining clips 24 adjacent either the wall 32 or ceiling 34 mounting panels. As explained previously, the expansion module 80 includes a plurality of recesses 84 which are defined by spring fingers 86. The expansion module 80 is adapted to be rotated about hub 82, thereby providing complete access to the cables mounted in the portion of the cable retaining clip 24 adjacent the corner panel 36. To further increase the cable carrying capacity of the duct molding 10 depicted in FIG. 5, the expansion module 80 can be used in pairs with a first expansion module 80 being mounted in a recess 26 of the cable retaining clip 24 adjacent the wall mounting panel 32. A second expansion module 80 then can be mounted in a recess 26 of the cable retaining clip 24 adjacent the ceiling mounting panel 34. This configuration of expansion modules 80 enables each expansion module 80 to be rotated about its respective hub 82 to provide complete access to the remainder of the cables 30 secured in the cable retaining clip 24.

Figure 6:
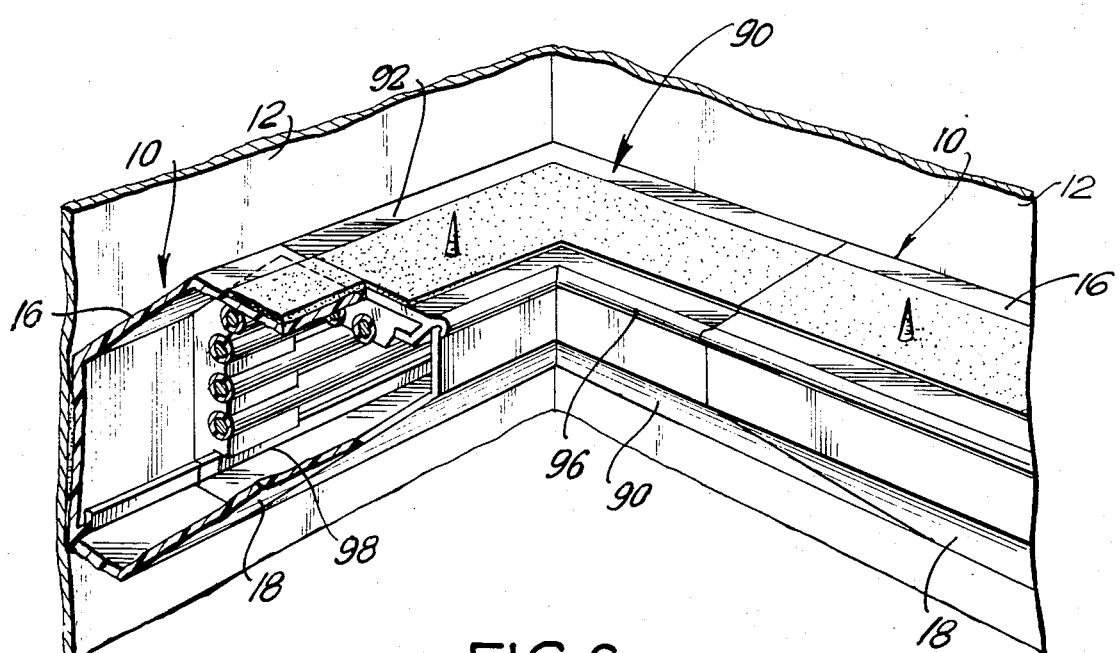
FIG. 6 is a prespective view, partially in section, of the subject duct molding used with a corner member.

Turning to FIG. 6, the duct molding 10 is used in conjunction with a duct molding corner 90. The latter is of hollow tubular construction and has a cross sectional configuration compatible with the duct molding 10. The corner 90 comprises a base member 92 and an intermediate cover member, intermediate cover members 18, which are adjacent thereto. The base member 92 is configured to receive clips 24 as explained above. The angular configuration of the corner 90 prevents the hinged rotation of the intermediate cover member with respect to the base 92. However, the base 92 and intermediate cover member are configured to be snap-fit together along the edges 96 and 98 of the corner 90. Alternatively, the base 92 and the intermediate cover member cover 94 may be ultrasonically welded prior to installation. The individual cables then may be manually urged through this short section 90 prior to insertion in the cable retaining clips 24.

In summary, an improved duct molding is provided which includes an elongated tubular duct molding portion having a base and a cover, and further including a plurality of cable retaining clips which are mounted in the base. More particularly, the base and cover of the duct molding are mounted with respect to one another such that the cover can be opened to provide access to the internal portion of the duct molding. The base of the duct molding includes a pair of rails each of which includes a flange. The flanges define a pair of slots into which the cable retaining clip may be inserted. The cable retaining clip includes a plurality of recesses defined by spring fingers for removably retaining individual cables. Expansion modules are provided which can be mounted in a recess of the cable retaining clip, and which can retain additional cables thereby increasing the cable carrying capacity of the subject duct molding. Corner duct molding members also are provided to accommodate sections of wall or ceiling that are angularly related to one another.

What is claimed is:

1. A duct assembly for retaining a plurality of cables, said assembly comprising:
   a unitary elongated base including two angularly related panels for respectively fixedly mounting against two angularly related planar surfaces;
   an elongated movable cover connected to and extending between said two angularly panels so as to define an elongated tubular enclosure therebetween when said movable cover is connected to said two angularly related panels;
   at least one cable retaining clip having a pair of ends, said ends being disposed within said enclosure and removably mounted to said base, said at least one clip including a plurality of pairs of bendable resilient cable retaining means, each of said pair of bendable resilient retaining means including a pair of spring fingers, each of said pair of spring fingers having bias means returning said pair of spring fingers to an initial position following said mounting of the cables therebetween, said each pair of spring fingers defining a recess thereinbetween; and
   at least one expansion module having a plurality of recesses for removably retaining cables, said expansion module including a mounting hub removably mounted in said recess of said cable retaining clip.

2. A duct assembly as in claim 1 wherein said cover includes a first edge hinqedly connected to one said panel of said base, and a second edqe releasably connected to the other said panel of said base, such that said cover may be hingedly rotated with respect to said base thereby providing access to said cables.

3. A duct assembly as in claim 2 wherein said cover and said base are formed from a unitary piece of plastic material.

4. A duct assembly as in claim 1 wherein the one said panel of said base includes a generally cylindrical groove, and wherein the first edge of said cover includes a generally cylindrical journal receivable in said groove, such that when said journal is placed in said groove the hinged connection between said cover and said base is defined.

5. A duct assembly as in claim 1 wherein said base includes a pair of mounting means for removably retaining said cable retaining clip.

6. A duct assembly as in claim 5 wherein each said clip mounting means comprises at least one rail extending from a portion of said base and at least one flange extending from said rail of said base, said at least one rail and said at least one flange defining at least one slot for slidably receiving one of said pair of ends of said cable retaining clip.

7. A duct assembly as in claim 6 wherein each said at least one rail and each said at least one flange extends substantailly parallel to the longitudinal axis of said base for substantially the entire length thereof.

8. A duct assembly as in claim 1 further comprising an adhesive means disposed adjacent each said angularly related panel for mounting said angularly related panels against said planar surfaces.

9. A duct assembly as in claim 1 wherein one said angularly related panel is a wall mounting panel, and wherein another angularly related panel is a ceiling mounting panel, said wall and ceiling mounting panels being generally perpendicular to one another.

10. A duct assembly as in claim 9 wherein said base further includes a corner panel extending angularly between and connecting said wall and ceiling mounting panels.

11. A duct assembly as in claim 1 wherein said expansion module is pivotably mounted in a recess thereby enabling complete access to said cables in said duct assembly.

12. A duct assembly as in claim 1 wherein said cable retaining clip is of unitary construction.

13. A duct assembly as in claim 1 including a plurality of cable retaining clips.

14. A duct assembly for retaining a plurality of cables, said assembly comprising:
    an elongated base including a corner panel, a ceiling mounting panel and a wall mounting panel, said ceiling and wall mounting panels being connected to each other and extending angularly from said corner panel such that said ceiling and wall mounting panels are substantially perpendicular to one another, said base further including a pair of rails connected respectively to said wall and ceiling mounting panels, each said rail including a flange disposed such that a slot is defined between each said flange and its respective ceiling or wall mounting panel;
    an elongated cover hingedly connected to said wall mounting panel and releasably connected to said ceiling panel so as to define an elongated tubular enclosure between said cover and said base with the rails being disposed within said enclosure;
    at least one cable retaining clip disposed within said enclosure and mounted in the slots formed therein, at least one clip including a plurality of pairs of resilient spring fingers, each spring finger including a base portion and an enlarged head portion whereby said pair of spring fingers having bias means returning said pair of spring fingers to an initial position following the mounting of the cables in a recess therebetween, and
    at least one expansion module having a plurality of recesses for removably retaining cables, said expansion module including a mounting hub removably mounted in said recess of said cable retaining clip, wherein said expansion module is pivotably mounted in said recess thereby enabling complete access to said cables in said duct assembly.

15. The duct assembly as in claim 1 wherein each said pair of spring fingers define a cable retaining recess, each said recess having an open mouth portion, said open mouth portion defining a plane, said plane being askew to both said planar surfaces.

* * * * *